US007389113B2

(12) United States Patent
Johnston (10) Patent No.: US 7,389,113 B2
(45) Date of Patent: Jun. 17, 2008

(54) ROAMING APPARATUS, SYSTEMS, AND METHODS WITH A PLURALITY OF RECEIVERS COUPLED TO A FIRST FREQUENCY REFERENCE TO COMMUNICATE WITH A FIRST STATION AND SELECTIVELY COUPLING ONE RECEIVER TO A SECOND FREQUENCY REFERENCE TO COMMUNICATE WITH A SECOND STATION

(75) Inventor: David Johnston, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 403 days.

(21) Appl. No.: 10/726,054

(22) Filed: Dec. 2, 2003

(65) Prior Publication Data

US 2005/0118964 A1   Jun. 2, 2005

(51) Int. Cl.
*H04Q 7/20* (2006.01)
(52) U.S. Cl. .................................. 455/452.2
(58) Field of Classification Search ............. 455/452.2, 455/436, 500, 526
See application file for complete search history.

(56) References Cited

U.S. PATENT DOCUMENTS

| 5,999,811 | A | 12/1999 | Molne |
| 6,728,517 | B2 * | 4/2004 | Sugar et al. ................... 455/73 |
| 6,735,442 | B2 * | 5/2004 | Tu et al. ...................... 455/434 |
| 6,954,446 | B2 * | 10/2005 | Kuffner ....................... 370/335 |
| 2003/0134607 | A1 * | 7/2003 | Raghavan et al. ............ 375/219 |
| 2004/0054471 | A1 * | 3/2004 | Bartlett et al. ............... 701/213 |

FOREIGN PATENT DOCUMENTS

WO    WO-02/093761 A1    11/2002

OTHER PUBLICATIONS

"International Search Report for corresponding PCT Application No. PCT/US2004/038733", (May 6, 2005), 2 pgs.

* cited by examiner

*Primary Examiner*—Rafael Perez-Gutierrez
*Assistant Examiner*—Gary Au
(74) *Attorney, Agent, or Firm*—Schwegman, Lundberg & Woessner, P.A.

(57) ABSTRACT

An apparatus and a system, as well as a method and article, may operate to couple a plurality of receivers to a first frequency reference to communicate with a first station over a corresponding plurality of signal paths, and to selectively couple one of the plurality of receivers to a second frequency reference to communicate with a second station over a search signal path not included in the plurality of signal paths.

17 Claims, 4 Drawing Sheets

ROAMING APPARATUS, SYSTEMS, AND METHODS WITH A PLURALITY OF RECEIVERS COUPLED TO A FIRST FREQUENCY REFERENCE TO COMMUNICATE WITH A FIRST STATION AND SELECTIVELY COUPLING ONE RECEIVER TO A SECOND FREQUENCY REFERENCE TO COMMUNICATE WITH A SECOND STATION

TECHNICAL FIELD

Various embodiments described herein relate to communications generally, including apparatus, systems, and methods used to effect wireless communication.

BACKGROUND INFORMATION

Wireless mobile devices may communicate via base-stations and "roam" between them. For example, if signal conditions degrade while communications are conducted with a first base-station, the wireless mobile device may determine that it is appropriate to stop using that base-station and start using a second base-station. The mechanism for transferring communications from one base-station to another may be called a "handoff," and the decision to perform a handoff may be based on a quality measurement associated with the communication channels available between the wireless mobile device and various base-stations. Thus, a wireless mobile device, such as a cellular telephone or wireless Personal Digital Assistant (PDA), may operate to identify base-stations that can be used for communication based on various quality considerations.

For many wireless mobile devices, the handoff decision can be assisted by engaging in a periodic "vacation period," wherein the mobile device retunes or redirects its radio receiver to listen for new base-stations. During the vacation period, the channel quality available from a new base-station can be evaluated, and a handoff may be performed if the wireless mobile device determines that a channel associated with the new base-station provides greater quality than is currently available. However, this method of operating may also serve to periodically interrupt the flow of communications/data between the wireless mobile device and the current base-station, even when no handoff is performed.

DETAILED DESCRIPTION

To assist in providing a high quality, "seamless" connection to one of several base-stations, many embodiments can operate to enable a wireless mobile device to make handoff decisions without interrupting communications with the current base station. For example, in a multiple-input, multiple-output (MIMO) communications scenario, where several receivers have a common frequency reference, each receiver may use a separate receive path (e.g., a wireless signal path through the air), and the system as a whole may be able to tolerate the loss of one receiver if the remaining receivers have sufficient signal quality to achieve the required quality of service desired for the system. To accomplish the goal of continuous communications within a MIMO system, one of the receivers may be configured to use either of two frequency references.

Thus, when a wireless mobile device constructed according to various embodiments searches for potential handoff base-stations, a single radio receiver (selected from several receivers) may be configured to use a second frequency reference to search for a new base-station. Communications with a current base-station can be maintained using the remaining receive paths and a first frequency reference.

Figure 1:
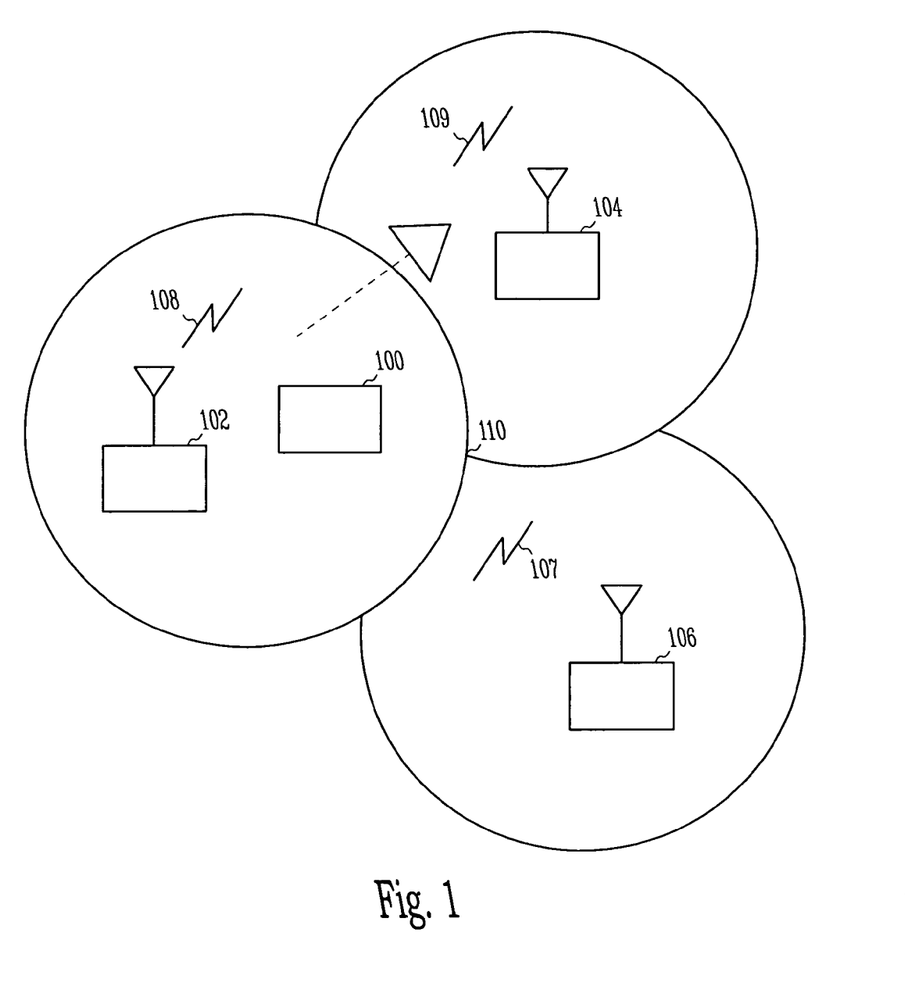
FIG. 1 is a block diagram of a wireless mobile device roaming between stations according to various embodiments.

FIG. 1 is a block diagram of a wireless mobile device 100 moving between stations 102, 104 (e.g., base-stations) according to various embodiments. For example, the wireless mobile device 100 may roam between communicating with a first station 102 and a second station 104. A third station 106 (e.g., a base-station) may also offer a connection 107 having channels for communication with the device 100 as the device 100 moves from communicating with the first station 102, using connection 108, to communicating with the second station 104, perhaps using connection 109. A handoff between the stations 102, 104 may be made, based on the quality of service available to the device 100 from the first station 102 and the second station 104. Connections 107, 108, and 109 may comprise one or more transmit paths, and/or one or more receive paths.

While the device 100 moves within an area covered by the stations 102, 104, it may be difficult to detect a better connection to either of the stations 102, 104. In fact, as movement occurs and as the connection with one of the stations 102, 104 loses signal strength (or incurs significant degrading interference), the device 100 may lose the connection 108 to the first station 102 due to weak signal strength.

Thus, in the intersecting area 110, the loss of communications can occur suddenly and without warning, such that the appearance of seamless roaming may be lost unless a new station 104, 106 having a better connection 107, 109, respectively, can be found. Several embodiments provide a mechanism to find such a connection. For example, using a searching receiver assisted by a second frequency reference, available new stations may be detected without interrupting ongoing communications, so as to provide a high quality, seamless connection for the device 100, including the existing connection 108 between the device 100 and the station 102, and/or the new connections 107, 109 (which may exist after a handoff of communications from the station 102 to one of the stations 104, 106, respectively).

Figure 2:
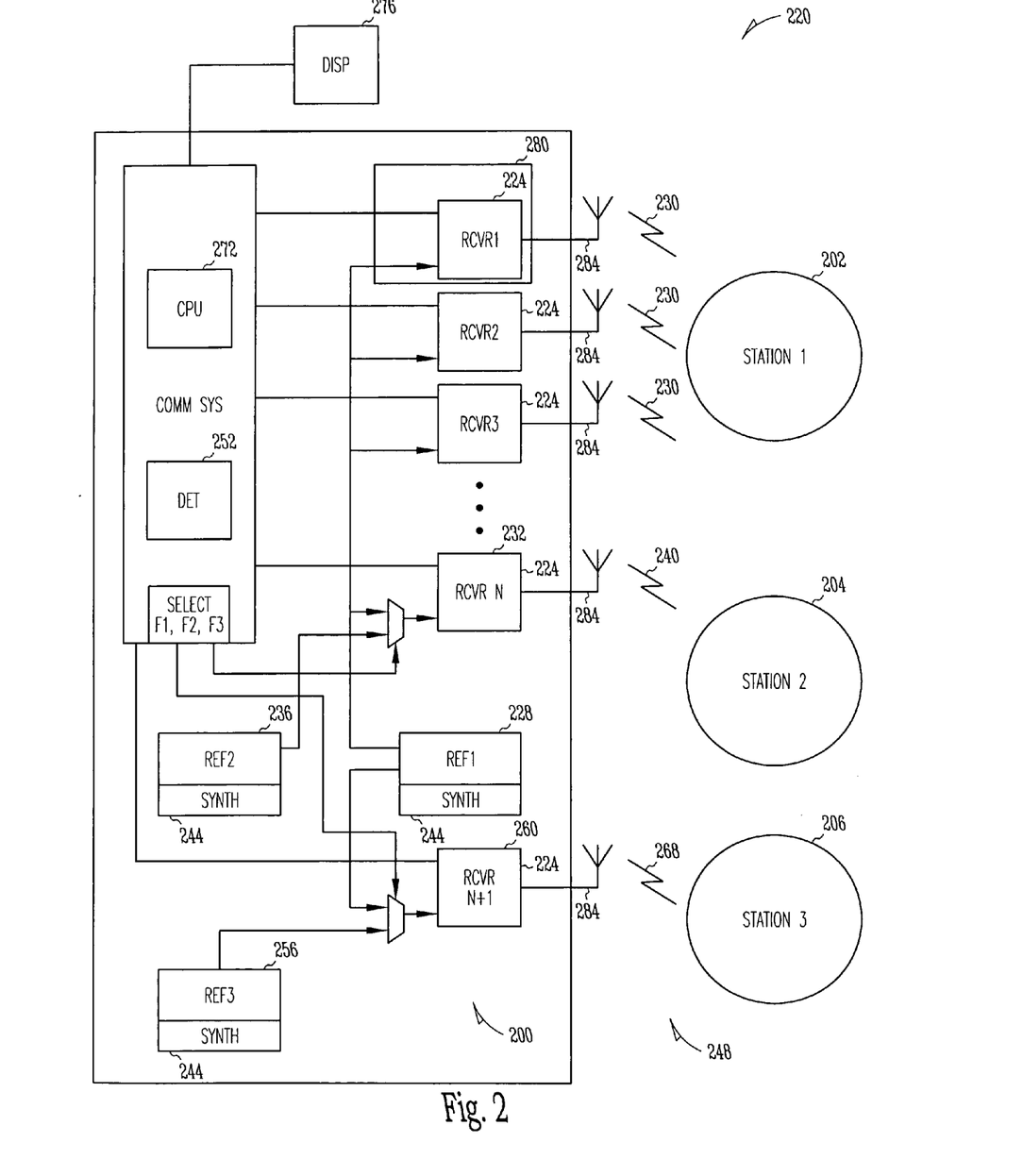
FIG. 2 is a block diagram of an apparatus and system according to various embodiments.

FIG. 2 is a block diagram of an apparatus 200 and system 220 according to various embodiments. An apparatus 200, which may comprise a wireless mobile device, similar to or identical to the device 100 shown in FIG. 1, may comprise a plurality of receivers 224 capable of being coupled to a first frequency reference 228. The apparatus 200 may be used to communicate with a first station 202 using a plurality of signal paths 230. One 232 or more of the plurality of receivers 224 can be selectively coupled to the first frequency reference 228 or to a second frequency reference 236 to communicate with a second station 204 using a search signal path 240 not included in the plurality of signal paths 230. The first frequency reference 228 may comprise a first frequency synthesizer 244, and the second frequency reference 236 may comprise a second frequency synthesizer 244.

In some embodiments, the apparatus 200 may include a third frequency reference 256, wherein another one 260 of the plurality of receivers 224 can be selectively coupled to the first frequency reference 228 or the third frequency reference 256 to communicate with a third station 206 using another search signal path 268 not included in the plurality of signal paths 230. In other embodiments, any number of alternate frequency references, receivers, and search signal paths (not included in the plurality of signal paths 230) may be selectively coupled and used to assist in making handoff decisions.

The apparatus 200 may include a determination module 252 to determine whether a quality of service provided by the second station 204 (or the third station 206) is greater than a quality of service provided by the first station 202. For the purposes of this disclosure, the term "quality of service", as provided by a station 202, 204, 206 in communication with the apparatus 200, may include one or more of a network type, a network capability, a network activity level, a signal strength, a bandwidth, a signal-to-noise ratio, a signal-to-interference ratio, a multipath condition, a service provider, a monetary cost, user-preferred information, and a user-preferred service, and any other service-related factor, whether measurable now or in the future.

Thus, the quality of service associated with a particular connection and/or base station (e.g., elements 102, 104, 106, and 107, 108, 109 in FIG. 1, and elements 202, 204, and 206 in FIG. 2) may be compared and ranked according to values selected by the user of the wireless mobile device 100, a network administrator, or an internet service provider (ISP), among others. The value of a particular quality of service sought by the device 200 may be associated with any of the items previously named. Quality of service may also be ranked according to the measured receive and/or transmit capabilities with respect to the wireless mobile device 200, the first, second, and third stations 202, 204, 206, or any combination of these.

In another embodiment, a system 220 may comprise the apparatus 200 described previously, as well as a processor 272 to couple to the plurality of receivers 224, and a display 276 to couple to the processor 272. The system 220 may comprise one or more transceivers 280, which may in turn include one or more of the receivers 224. Each of the plurality of receivers 224 may be coupled to an individual antenna 284, such that there is a one-to-one corresponding plurality of antennas 284 to couple to the plurality of receivers 224. One or more of the antennas 284 may be a monopole, a dipole, an omnidirectional antenna, or a patch antenna, among others.

Any of the reference frequencies F1, F2, F3 provided by any frequency reference 228, 236, 256 included in the apparatus 200 and systems 220 described herein may be selected in accordance with one or more channels designated by an Institute of Electrical and Electronics Engineers (IEEE) 802.11 standard. For more information on IEEE 802.11 standards, please refer to "IEEE Standards for Information Technology—Telecommunications and Information Exchange between Systems—Local and Metropolitan Area Network—Specific Requirements—Part 11: Wireless Local Area Network (LAN) Medium Access Control (MAC) and Physical Layer (PHY), ISO/IEC 8802-11: 1999" and related versions. The reference frequencies F1, F2, F3 provided by any frequency reference 228, 236, 256 included in the apparatus 200 and systems 220 described herein may also be selected in accordance with one or more channels designated by an Institute of Electrical and Electronics Engineers (IEEE) 802.16 standard. For more information on IEEE 802.16 standards, please refer to "IEEE Std 802.16-2001 IEEE Standard for Local and Metropolitan Area Networks—Part 16—Air Interface for Fixed Broadband Wireless Access Systems," approved Dec. 6, 2001, and related versions.

As noted previously, the plurality of signal paths 230 may comprise a portion of a MIMO communications system 248. In addition, the plurality of signal paths 230, as well as the search signal paths 240 and 268 may comprise two-way communications between the apparatus 200 and the stations 202, 204, 206. This may be effected by a plurality of transceivers 280, including a corresponding plurality of receivers 224. Thus, the apparatus 200 may engage in both passive and active scanning to communicate with other stations (e.g. stations 204, 206) along the search signal paths 240, 268 to determine whether a better quality of connection may be available. The searching or scanning process may be conducted according to procedures set forth in various standards (e.g., IEEE 802.11 and 802.16).

The wireless mobile device 100, apparatus 200, stations 102, 104, 106, 202, 204, 206, connections 107, 108, 109, intersecting area 110, system 220, receivers 224, 232, 260, frequency references 228, 236, 256, signal paths 230, 240, 268, frequency synthesizers 244, MIMO communications system 248, determination module 252, processor 272, display 276, transceiver 280, and antennas 284 may all be characterized as "modules" herein. Such modules may include hardware circuitry, and/or one or more processors and/or memory circuits, software program modules, including objects and collections of objects, and/or firmware, and combinations thereof, as desired by the architect of the device 100, apparatus 200, and the system 220, and as appropriate for particular implementations of various embodiments.

It should also be understood that the apparatus and systems of various embodiments can be used in applications other than for wireless mobile devices, and other than for roaming between base-stations, and thus, various embodiments are not to be so limited. The illustrations of a device 100, apparatus 200, and system 220 are intended to provide a general understanding of the structure of various embodiments, and they are not intended to serve as a complete description of all the elements and features of apparatus and systems that might make use of the structures described herein.

Applications that may include the novel apparatus and systems of various embodiments include, but are not limited to, electronic circuitry used in high-speed computers, communication and signal processing circuitry, modems, processor modules, embedded processors, and application-specific modules, including multilayer, multi-chip modules. Such apparatus and systems may further be included as sub-components within a variety of electronic systems, such as televisions, cellular telephones, personal computers, workstations, PDAs, radios, video players, vehicles, and others.

Figure 3:
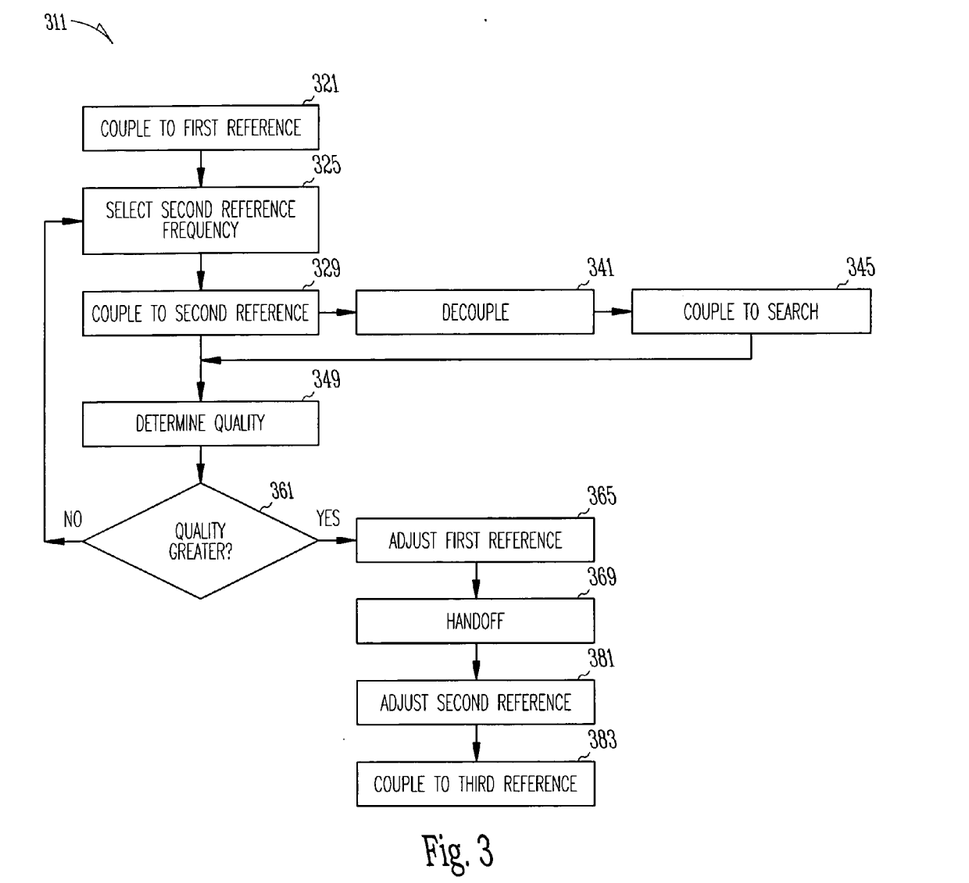
FIG. 3 is a flow chart illustrating several methods according to various embodiments.

FIG. 3 is a flow chart illustrating several methods according to various embodiments. Thus, a method 311 may (optionally) begin with coupling a plurality of receivers to a first frequency reference to communicate with a first station over a corresponding plurality of signal paths at block 321. The method 311 may continue with selecting a second reference frequency (e.g., included in or provided by a second frequency reference) at block 325 based on an arbitrary scan process (e.g., scanning in the local area to determine accessible stations in a periodic, aperiodic, or random fashion), a list of frequencies (e.g., a preselected list including stations likely to be encountered by the plurality of receivers), and/or the location of the plurality of receivers with respect to stations that may be in the wireless communication area.

The method 311 may include selectively coupling one of the plurality of receivers to the second frequency reference to communicate with a second station over a search signal path not included in the plurality of signal paths at block 329. In some embodiments, for example, when the plurality of receivers are configured to operate as a MIMO system, selectively coupling one of the plurality of receivers to the second frequency reference may further include decoupling one of the plurality of receivers from operating as a part of the MIMO system at block 341 and coupling the decoupled receiver to operate as a search receiver independent from the MIMO system at block 345.

The method 311 may continue with determining whether a quality of service provided by the second station is greater than a quality of service provided by the first station at block 349. As noted above, the quality of service provided by any particular station may include one or more of a network type, a network capability, a network activity level, a signal strength, a bandwidth, a signal-to-noise ratio, a signal-to-interference ratio, a multipath condition, a service provider, a monetary cost, user-preferred information, and a user-preferred service, among others.

If the quality of service provided by the second station is determined to be greater than that available from the first station at block 361, then the method 311 may continue at block 365 with adjusting the first frequency reference to provide a reference frequency substantially equal to a reference frequency provided by the second frequency reference. Otherwise, the method 311 may continue with selecting another reference frequency to use as the second reference frequency at block 325.

After adjusting the first frequency reference at block 365, the method 311 may continue with handing off communications (e.g., the communications occurring between the first station and the plurality of receivers) from the first station to the second station at block 369. That is, a handoff may occur after determining that the quality of service provided by the second station is greater than the quality of service provided by the first station at block 361. The method 311 may continue with adjusting the second frequency reference to provide a new reference frequency at block 381, and communicating with a new station using a new search signal path not included in the plurality of signal paths, such as by selectively coupling another one of the plurality of receivers to a third frequency reference to communicate with a third station over another search signal path not included in the plurality of signal paths at block 383. As noted previously, any number of alternate frequency references, receivers, and search signal paths (not included in the plurality of signal paths) may be selectively coupled and used to assist in making handoff decisions.

It should be noted that the methods described herein do not have to be executed in the order described, or in any particular order. Moreover, various activities described with respect to the methods identified herein can be executed in serial or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java, Smalltalk, or C++. Alternatively, the programs can be structured in a procedure-orientated format using a procedural language, such as assembly or C. The software components may communicate using any of a number of mechanisms well-known to those skilled in the art, such as application program interfaces or interprocess communication techniques, including remote procedure calls. The teachings of various embodiments are not limited to any particular programming language or environment, including Hypertext Markup Language (HTML) and Extensible Markup Language (XML).

Figure 4:
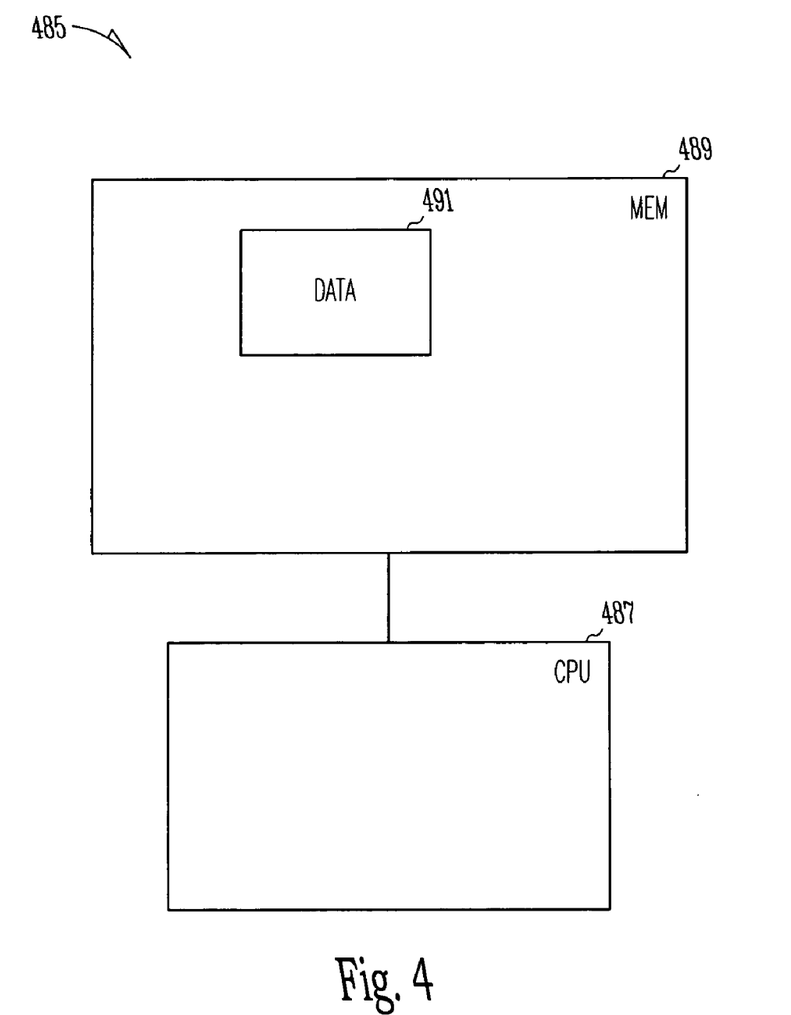
FIG. 4 is a block diagram of an article according to various embodiments.

Thus, other embodiments may be realized. For example, FIG. 4 is a block diagram of an article 485 according to various embodiments, such as a computer, a wireless mobile device, a memory system, a magnetic or optical disk, some other storage device, and/or any type of electronic device or system. The article 485 may comprise a processor 487 coupled to a machine-accessible medium such as a memory 489 (e.g., a memory including an electrical, optical, or electromagnetic conductor) having associated data 491 (e.g., computer program instructions), which, when accessed, results in a machine (e.g., the processor 487) performing such actions as coupling a plurality of receivers to a first frequency reference to communicate with a first station over a corresponding plurality of signal paths, and selectively coupling one of the plurality of receivers to a second frequency reference to communicate with a second station over a search signal path not included in the plurality of signal paths.

The receivers, as noted above, may be configured to operate as a MIMO system. Selectively coupling one of the plurality of receivers to the second frequency reference may include decoupling one of the plurality of receivers from operating as a part of the MIMO system and coupling the decoupled receiver to operate as a search receiver independent from the MIMO system.

Other actions may include selecting a second reference frequency to be provided by the second frequency reference based on one of an arbitrary scan process, a list of frequencies, and a location of the plurality of receivers. As noted above, any reference frequency may be selected in accordance with a channel designated by an IEEE 802.11 standard. Any one or more of the receivers may be included in one or more transceivers.

Improved connection quality may result from implementing the devices, apparatus, systems, and methods disclosed herein. The time spent by a mobile wireless device in attempting to determine the availability of stations offering a connection of greater quality may be reduced, while improving the quality of existing connections during the search process.

The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus the following claims are hereby incorporated into the Detailed Description, with each claim standing on its own as a separate embodiment.

What is claimed is:

1. A method, comprising:
coupling a plurality of receivers to a first frequency reference to communicate with a first station over a corresponding plurality of signal paths, wherein the plurality of receivers comprises at least three receivers;
selectively coupling one of the plurality of receivers to a second frequency reference to communicate with a second station over a signal path not included in the plurality of signal paths; and
handing off communications with the plurality of receivers from the first station to the second station after determining that a quality of service provided by the second station is greater than a quality of service provided by the first station,
wherein the plurality of receivers are configured to operate as a multiple-input multiple-output system, and wherein selectively coupling one of the plurality of receivers to the second frequency reference further includes
decoupling the one of the plurality of receivers from operating as a part of the multiple-input multiple-output system, while continuing to operate at least two of the plurality of receivers as a multiple-input multiple-output system;
coupling the one of the plurality of receivers to operate as a search receiver independent from the multiple-input multiple-output system;
the search receiver using a new reference frequency different from the first frequency reference; and
the search receiver communicating with the second station using the new reference frequency.

2. The method of claim 1, wherein the quality of service provided by the first station includes at least one of a network type, a network capability, a network activity level, a signal strength, a bandwidth, a signal-to-noise ratio, a signal-to-interference ratio, a multipath condition, a service provider, a monetary cost, user-preferred information, and a user-preferred service.

3. The method of claim 1, further comprising:
adjusting the first frequency reference to provide a reference frequency substantially equal to a reference frequency provided by the second frequency reference.

4. The method of claim 1, further comprising:
selectively coupling another one of the plurality of receivers to a third frequency reference to communicate with a third station over another signal path not included in the plurality of signal paths; and
handing off communications with at least two of the plurality of receivers, while such two receivers are configured to operate as a multiple-input multiple-output system, from the second station to the third station after determining that a quality of service provided by the third station is greater than a quality of service provided by the second station.

5. An article comprising a machine-accessible medium having associated data, wherein the data, when accessed, results in a machine performing:
coupling a plurality of receivers to a first frequency reference to communicate with a first station over a corresponding plurality of signal paths, wherein the plurality of receivers comprises at least three receivers;
selectively coupling one of the plurality of receivers to a second frequency reference to communicate with a second station over a signal path not included in the plurality of signal paths; and
handing off communications with the plurality of receivers from the first station to the second station after determining that a quality of service provided by the second station is greater than a quality of service provided by the first station,
wherein the plurality of receivers are configured to operate as a multiple-input multiple-output system, and wherein selectively coupling one of the plurality of receivers to the second frequency reference further includes
decoupling the one of the plurality of receivers from operating as a part of the multiple-input multiple-output system, while continuing to operate at least two of the plurality of receivers as a multiple-input multiple-output system;
coupling the one of the plurality of receivers to operate as a search receiver independent from the multiple-input multiple-output system;
the search receiver using a new reference frequency different from the first frequency reference; and
the search receiver communicating with the second station using the new reference frequency.

6. The article of claim 5, wherein the data, when accessed, results in the machine performing:
selecting a second reference frequency to be provided by the second frequency reference based on one of an arbitrary scan process, a list of frequencies, and a location of the plurality of receivers.

7. The article of claim 5, wherein a first reference frequency to be provided by the first frequency reference is selected in accordance with a channel designated by one of an Institute of Electrical and Electronics Engineers (IEEE) 802.11 standard or an IEEE 802.16 standard.

8. The article of claim 5, wherein a selected one of the plurality of receivers is included in a transceiver.

9. An apparatus, comprising:
a plurality of receivers to couple to a first frequency reference and to communicate with a first station using a plurality of signal paths, wherein the plurality of receivers comprises at least three receivers, at least two of which are to operate as part of a multiple-input multiple-output system;
a circuit to decouple one of the plurality of receivers from operating as a part of the multiple-input multiple-output system, while at least two of the plurality of receivers continue to operate as the multiple-input multiple-output system;
a circuit to couple the one of the plurality of receivers to operate as a search receiver independent from the multiple-input multiple-output system, the search receiver to use a new reference frequency different from the first frequency reference, and the search receiver to communicate with a second station using the new reference frequency;

a determination module to compare a quality of service provided by the first and second stations; and a circuit, responsive to the determination module, to hand off communications with the plurality of receivers from the first station to the second station if the quality of service provided by the second station is greater than the quality of service provided by the first station.

10. The apparatus of claim 9, wherein the first frequency reference comprises a first frequency synthesizer, and wherein the second frequency reference comprises a second frequency synthesizer.

11. The apparatus of claim 9, wherein the quality of service provided by the first station includes at least one of a network type, a network capability, a network activity level, a signal strength, a bandwidth, a signal-to-noise ratio, a signal-to-interference ratio, a multipath condition, a service provider, a monetary cost, user-preferred information, and a user-preferred service.

12. The apparatus of claim 9, further comprising:
a third frequency reference, wherein at least another one of the plurality of receivers can be selectively coupled to the first frequency reference or the third frequency reference to communicate with a third station using another signal path not included in the plurality of signal paths.

13. The apparatus of claim 9, wherein the plurality of signal paths comprise a portion of a multiple-input, multiple-output communication system, and wherein the signal path is a search signal path, further comprising:
a third frequency reference, wherein at least another one of the plurality of receivers can be selectively coupled to the first frequency reference or the third frequency reference to communicate with a third station using a second search signal path not included in the plurality of signal paths.

14. A system, comprising:
a plurality of receivers to couple to a first frequency reference and to communicate with a first station using a plurality of signal paths, wherein the plurality of receivers comprises at least three receivers, at least two of which are to operate as part of a multiple-input multiple-output system;

a circuit to decouple one of the plurality of receivers from operating as a part of the multiple-input multiple-output system, while at least two of the plurality of receivers continue to operate as the multiple-input multiple-output system;

a circuit to couple the one of the plurality of receivers to operate as a search receiver independent from the multiple-input multiple-output system, the search receiver to use a new reference frequency different from the first frequency reference, and the search receiver to communicate with a second station using the new reference frequency;

a determination module to compare a quality of service provided by the first and second stations;

a circuit, responsive to the determination module, to hand off communications with the plurality of receivers from the first station to the second station if the quality of service provided by the second station is greater than the quality of service provided by the first station;

a processor to couple to the plurality of receivers; and
a display to couple to the processor.

15. The system of claim 14, further comprising:
a transceiver including a selected one of the plurality of receivers.

16. The system of claim 14, further comprising:
a third frequency reference, wherein at least another one of the plurality of receivers can be selectively coupled to the first frequency reference or to the third frequency reference to communicate with a third station using another signal path not included in the plurality of signal paths.

17. The system of claim 14, further comprising:
a one-to-one corresponding plurality of antennas to couple to the plurality of receivers.

* * * * *

UNITED STATES PATENT AND TRADEMARK OFFICE
CERTIFICATE OF CORRECTION

| | | |
|---|---|---|
| PATENT NO. | : 7,389,113 B2 | Page 1 of 1 |
| APPLICATION NO. | : 10/726054 | |
| DATED | : June 17, 2008 | |
| INVENTOR(S) | : Johnston | |

It is certified that error appears in the above-identified patent and that said Letters Patent is hereby corrected as shown below:

On the Title page, item (56), under "Other Publications", in column 2, line 2, delete "2" and insert -- 3 --, therefor.

Signed and Sealed this

Sixteenth Day of September, 2008

JON W. DUDAS
*Director of the United States Patent and Trademark Office*